Oct. 7, 1941.  H. G. BROWN, JR  2,258,351
ADVERTISING HOROSCOPE MACHINE
Filed Nov. 24, 1939  3 Sheets-Sheet 1
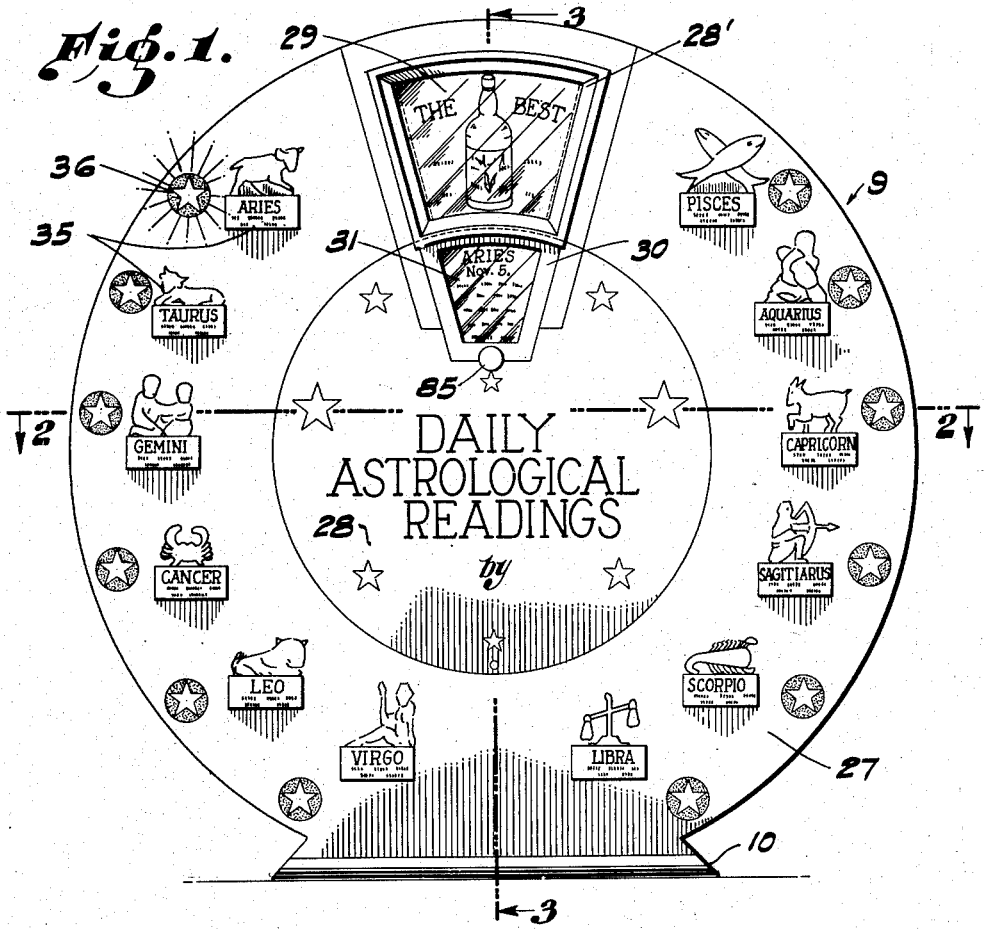
Fig. 1.
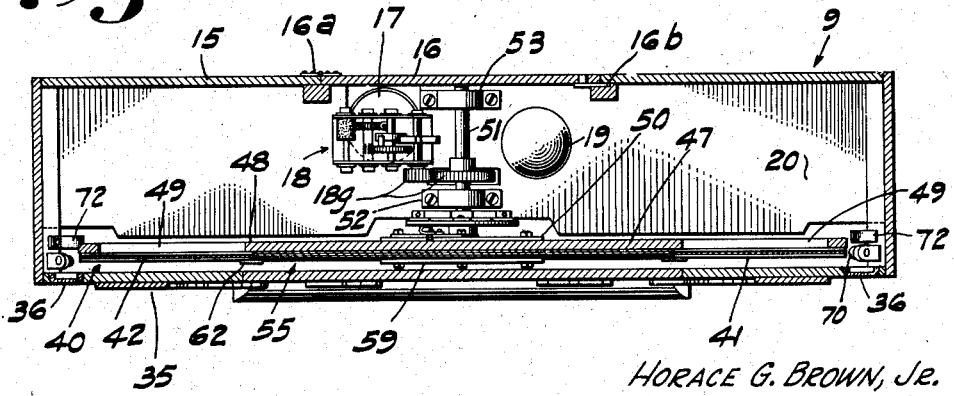
Fig. 2.
HORACE G. BROWN, JR.
INVENTOR.
BY 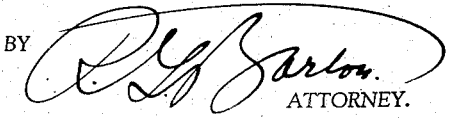
ATTORNEY.

Oct. 7, 1941.    H. G. BROWN, JR    2,258,351
ADVERTISING HOROSCOPE MACHINE
Filed Nov. 24, 1939    3 Sheets-Sheet 2
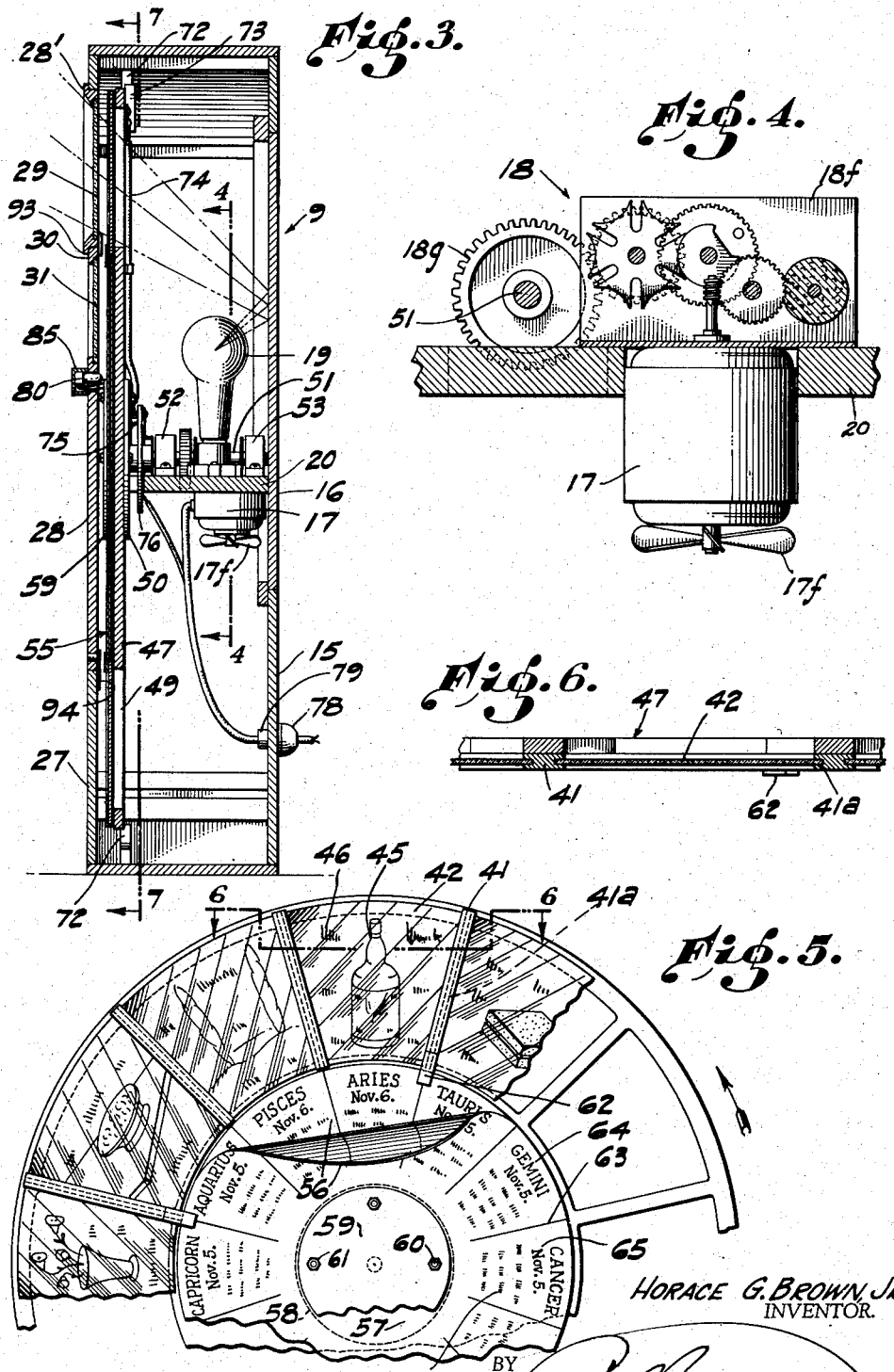
Horace G. Brown, Jr.
INVENTOR.
BY 
ATTORNEY Oct. 7, 1941.   H. G. BROWN, JR   2,258,351
ADVERTISING HOROSCOPE MACHINE
Filed Nov. 24, 1939   3 Sheets-Sheet 3
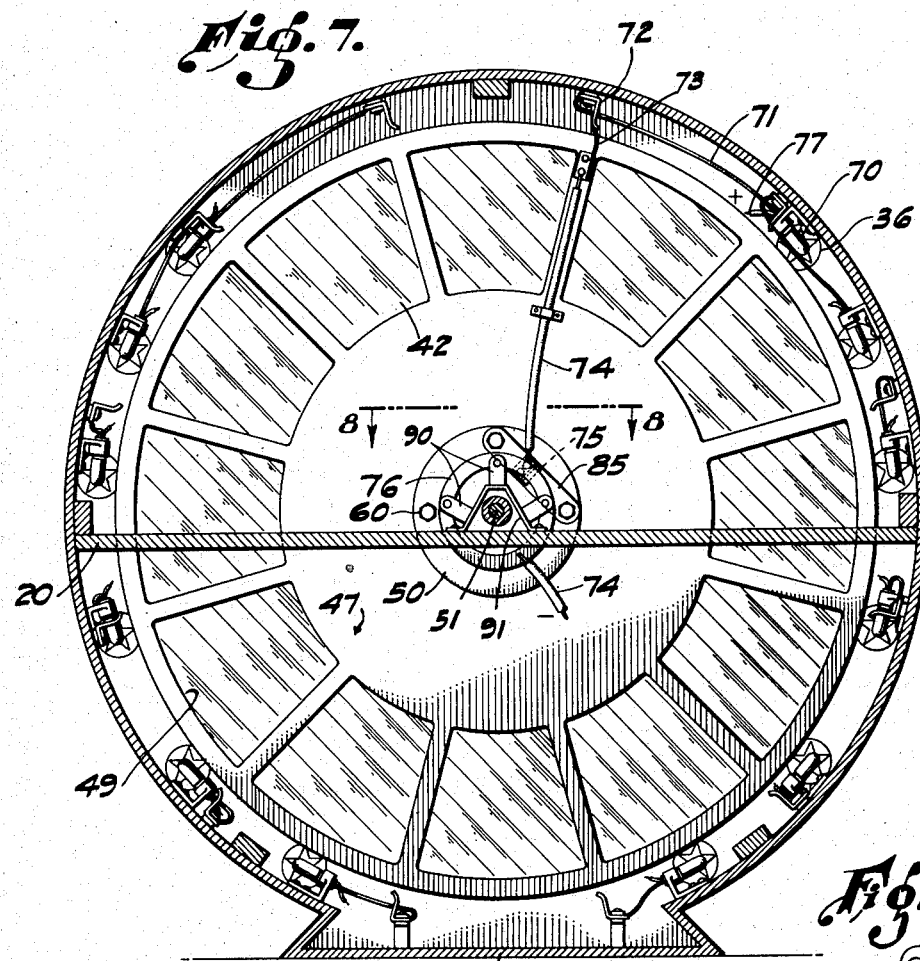
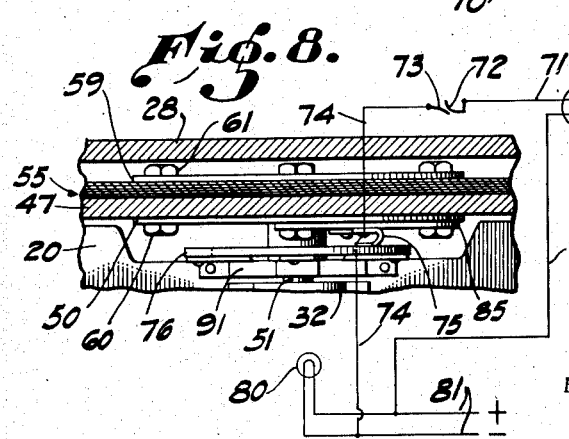
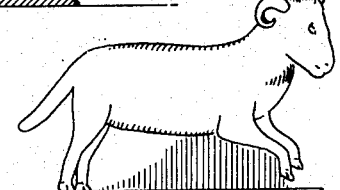
HORACE G. BROWN, JR.
INVENTOR.
BY
ATTORNEY.

Patented Oct. 7, 1941

2,258,351

UNITED STATES PATENT OFFICE 2,258,351

ADVERTISING HOROSCOPE MACHINE

Horace G. Brown, Jr., Los Angeles, Calif.

Application November 24, 1939, Serial No. 305,942

4 Claims. (Cl. 40—34)

My invention relates to advertising devices displaying daily astrological readings.

This is a continuation-in-part application of my invention entitled Advertising devices filed May 2, 1939, Serial Number 271,250.

An important object of the invention is to provide in a device of the above character improved means for attracting the attention of people by giving to them a current astrological reading and causing them at the same time to view advertising matter which might go unnoticed were it not for the added attraction afforded by the horoscopic feature.

A further object of the invention is to provide in advertising machines improved means for mounting and detaching associated horoscopic literature.

Another object of the invention resides in the novel associating of horoscopic predictions with their governing signs and planets and the unique manner of identifying a zodiacal sign with a planet indication to which such prediction refers.

A still further object of the invention is to provide an advertising means associated with a machine displaying daily astrological readings which are inscribed on sheets scored in such a manner as to render a peripheral portion of each sheet readily severable from the core portion thereof.

Yet a more specific object of the invention is to provide a device that is simple in construction, reliable, and automatic in operation whereby two disks, one of which carries advertising matter and the other astrological readings are rotated in such a manner that portions of each disk are simultaneously exposed to view for a predetermined period of time in which the observer can readily see the advertising matter and view the daily astrological reading.

Yet still another object of the invention is to afford merchandisers the advantages of display advertising at the point of purchase and especially advertising display means that does not occupy so much space. Because facilities for point of purchase advertising are limited and because point of purchase advertising has proved to be effective to the retailer in the promotion of sales, the present invention will prove more valuable to the retailer.

Still other objects, features, and advantages of invention will hereinafter appear.

In the drawings showing the present preferred embodiment of the invention,

Fig. 1 is a front elevation of the device.

Fig. 2 is a transverse section taken on line 2—2 of Fig. 1.

Fig. 3 is a vertical section taken on line 3—3 of Fig. 1.

Fig. 4 is an enlarged fragmentary vertical section taken on line 4—4 of Fig. 3.

Fig. 5 is a fragmentary face view of the rotatable disks, a portion of the foremost sheet of the superimposed sheets of the composite disk being turned down to disclose part of the next underlying sheet.

Fig. 6 is a section taken on line 6—6 of Fig. 5.

Fig. 7 is a vertical section taken on line 7—7 of Fig. 3.

Fig. 8 is a fragmentary transverse section taken on line 8—8 of Fig. 7. Included in the view is a wiring diagram.

Fig. 9 is an enlarged face view of one of the zodiacal signs shown upon the face of the machine as illustrated in Fig. 1.

Referring in detail to the drawings, the operating parts of the device are supported by and enclosed within a drum-shaped casing 9 which is furnished at one side with a peripheral base portion 10 to support said casing with its axis extending in a horizontal direction as shown in Figs. 1 and 7. Said casing is furnished with a back wall 15 having a hinged portion 16 to provide for inspection and insertion into the casing of a motor 17 together with a Geneva movement structure 18 and a lamp 19, these parts being supported by a horizontal shelf 20 which extends diametrically across the casing and is supported therein in any suitable manner.

The front of the casing comprises a permanent annular peripheral portion 27 and a removable central panel 28 which normally overlies the space included within said front part 27. In the upper portion of the annular part 27 is a segmental main window 28' provided with a pane 29 of any suitable transparent material, and in the upper portion of the removable center plate 28 is an auxiliary horoscopic window 30 which is furnished with a pane 31 of any suitable transparent material. It is to be understood however that the two said windows may merely be openings provided to disclose a printed or written material hereinafter described.

Upon the face of the annular part 27 are inscribed or printed pictorial and written representations 35 of the twelve signs of the zodiac as shown in Fig. 1. These zodiacal signs, one of which is shown on an enlarged scale in Fig. 9, are arranged adjacent to the periphery of said plate 27 in a suitably spaced manner, there being adjacent to each of said signs an indication 36 which is electrically illuminated at predetermined times.

Behind the annular face plate 27 and the removable plate 28, included therewithin, is stationed a rotatable annular skeletal disk 40 having a series of peripheral radially extending arms 41, said arms being at proper distances from each other to provide for supporting between adjacent arms the advertising placards 42 which are insertable in a radially inward manner between adjacent arms to be held frictionally tight in place. Each arm 41 is furnished along each side with a longitudinal groove 41a of a suitable size to have fitted into it an edged portion of a said placard 42. These placards 42 are shown made of a transparent sheet material, in order that light may shine through them from the lamp 19 and illuminate the various pictorial representations 45 and printed matter 46 inscribed upon them for advertising purposes.

In order to rotatably support the skeletal disk 40, said disk is fixed to and carried by a circular bearing disk 47 which has a diameter slightly greater than the diameter of the space included within the skeletal disk 40, and these two disks are firmly secured together along their annular overlapping portion 48, and said disks 40 and 47 may be said to comprise a master disk. The bearing disk 47 is furnished with a series of large peripheral openings 49, each of which interiorly overlies the space occupied by an individual placard 42, thus admitting the light from the lamp 19 to the rear face of said placard to illuminate the advertising matter inscribed thereon. Said bearing disc is fixed by means of the face plate bearing 50 to one end of a driving shaft 51 supported concentrically of the casing by bearings 52 and 53 secured to the upper surface of the shelf 20. Said shaft 51 is intermittently driven from the motor 17 in a well-known manner by the Geneva movement mechanism 18, suitable speed reduction gearing 18g being provided between said Geneva movement and shaft.

The Geneva mechanism 18 is mounted on the U-shaped frame 18f to which the motor end bell is fastened by welding or other suitable fastening means in this manner pendantly supporting the motor 17. The motor shaft may carry a fan 17f.

The mechanism just described causes the advertising placards 42 to be displayed successively through the window 28', each placard remaining at rest back of said window a predetermined length of time to allow the observer to consider the matter inscribed thereon and to observe his or her daily astrological reading in the window 30.

The annular overlapping connection 48 between the disk structures 40 and 47 provides a circular depression or containing space concentric to and overlying the face of said bearing disk 47 and within this space is fitted a composite disk comprising a circular pack 55 of superimposed sheets 56 as shown for example in Figs. 2 and 5. Each of said sheets 56 has a circular portion or core 57 surrounded by a perforated line 58. The central part 57, made up of the superimposed sheets, is secured to the bearing disk 47 by means of the plate 59 or any suitable attaching means such as bolts 60 provided with nuts 61. Hence, the outermost sheet of the superimposed sheets 56 may whenever desired be removed by tearing it away from the scoring line 58 thus exposing to view the next underlying sheet. A series of keeper lugs 62 which constitute inward extensions of skeletal disk arms 41, are provided to overlie the outer peripheral portions of the sheets 56 in order to guard against their edge portions buckling over forwardly or otherwise getting out of place.

Each of the sheets 56, outside of its perforated line 58 is marked off by lines 63, thus dividing the peripheral portion of each of said sheets 56 into segmental areas, there being inscribed upon each of these areas a zodiacal designation 64, a date designation 65 and a printed or written astrological reading 66 which recites the supposed lucky or unlucky omens to be associated with the date designation 65.

Referring again to the series of indications comprising lenses 36 which at suitable times are individually electrically energized to inform the observer when his zodiacal sign appears in the window 30, the means for producing this electrical energization includes a lamp 70, see Fig. 7, located behind each lens, a conductor 71 leading from said lamp to a terminal 72 mounted interiorly of the peripheral wall of the drum with which is associated a resilient circuit completing member 73 which in turn is furnished with current from a wire 74. Said wire 74 is connected to a brush 75 which is in constant electrical connection with a stationary conducting ring 76. The aforesaid circuit completing member 73, being carried by the skeletal disk 40, is by the rotation of said disk successively brought into contact with the individual terminals 72, thereby successively illuminating the lens 36 which at such time is to be identified with the zodiacal prediction appearing in the window 30. Conductor wire 77 with conductor wire 74 connected to any suitable source of power by means of the plug 78 completes the electric circuit to the lamp 70, each of the other circuits to the various lamps is a duplicate of that shown diagrammatically in Fig. 8.

A lamp 80 is shown in Fig. 3 and shown diagrammatically in Fig. 8 carried by the cover plate 28 adjacent the lower side of window 30. Said lamp directs inwardly of the cover rays of light to illuminate the matter being displayed through the window 30. Current is furnished said lamp by wires 81 joined to the cable connecting with the plug 78 through the medium of the socket 79. Said lamp is shown furnished with a cover 85.

A stationary conducting ring 76 shown in Fig. 7, is fastened to and supported by flanges 90 radially extending from a triangularly shaped bracket 91 fastened to the shelf 20. Said ring is properly insulated apart from said bracket at the point where the ring abuts said flanges.

Referring to additional structural details, the door 16 at the back side of the casing is shown carried by hinges 16a and normally held in this closed position by latching means 16b.

The central removable portion 28 of the front panel is held in position by means of the downwardly projecting arcuated lip 93, see Fig. 3, of the horoscope window 30 and the keeper 94 of its latching means. A slight vertical tilt of the panel will permit its insertion under the lip preparatory to its final positioning in the machine.

*Operation*

In the operation of the device the electric plug 78 connected to any suitable source of power is inserted in the socket 79 in the cabinet closing the circuit to the motor 17, and lamps 19 and 80. Energizing the motor 17 causes the Geneva movement 18 and reduction gearing 18g to start operating in turn rotating shaft 51. Shaft 51 being rigidly fastened to the part 50 and the part 50 being bolted to the disks 40 and 47 together with the composite disk 55, these parts all start rotating in unison. There are twelve placards 42 and twelve readings 66 one for each sign 35 of the zodiac and one for each day of the month for each calendar year. Each sign carries a certain number of days, and in Fig. 9 the sign Aries is forecasted to govern the days of March 21 to April 23. Each of the other signs will likewise carry their allotted days. Hence, any observer appearing before the machine may select his or her sign by referring to the day on the sign on which their birthday occurs.

As the disks continue to rotate at periodic intervals, every thirty degrees the sign which the observer has selected will eventually be illuminated by the lamp 70 in the rear of the indication 36, and the observer's corresponding astrological reading 66 will appear in window 30. Sufficient time is allotted for the horoscope to be read due to the well known step movement of the Geneva mechanism.

Lamp 80 burns continuously, likewise lamp 19, but lamp 70 is only energized when the resilient switch element 73 contacts the terminal 72 to close its circuit.

The operation of this make and break circuit will now be set forth. Wire 74 connects with ring 76. Brush 75, fastened to the insulated bar 85, which is bolted to the part 50 and hence rotates therewith, is in continuous contact with ring 76. Lead wire 74 is connected to the brush 75, and element 73 is also fastened to disk 47. At each stop interval, element 73 closes the circuit with terminal 72 in turn energizing lamp 70 to illuminate the indication in the manner illustrated in Fig. 1. In the latter figure, the zodiacal sign Aries is illuminated and in the window 30 appears the reading for the individuals born between March 21 and April 23.

The illumination of the indication adjacent each sign will inform the observer approximately the length of time he will have to wait before his reading comes into view. For example, in Fig. 1 the Aries people will be reading their forecast while the machine will indicate to the Pisces people they must wait a complete turn of the disk.

Hence, by this invention horoscopic information is provided which requires the observer to wait different time periods, none of which will be so long as to unduly try his patience, and during such waiting periods he will naturally occupy his time reading a series of different advertisements for the display of which the proprietor of the machine is being profitably compensated.

Since those people who wish to see what each day of the year is forecasted for them, and many people still believe in these signs, a large majority of the shopping public will be drawn each day to the point of purchase where these machines are placed, in turn purchasing articles there while being influenced to make such purchases by the advertising shown on the machine.

It should be understood that the present disclosure is for the purpose of illustration only and that this invention includes all modifications and equivalents which fall within the scope of the subject matter claimed.

What is claimed is:

1. A casing having a face plate overlying an annular area, a master disk supported by said casing to rotate about an axis concentric with said annular area, a composite disk composed of a multiplicity of superimposed sheets each having a horoscopic printed area, means to mount said composite disk on said master disk in a concentric overlying relation to a face thereof, said sheets being individually detachable to successively display new areas of their printing matter, a cover overlying said composite disk, said cover having a horoscope window through which said horoscopic matter is observable, means to rotate said master disk in a timed step by step fashion to bring said horoscopic printed areas into view through said horoscope window, and a series of zodiacal signs visibly mounted upon the outer peripheral portion of said face plate, said signs each portraying, astrologically, a sign of the zodiac and having juxtaposed thereto designations of the calendar days allotted to such sign, thereby acquainting an observer with the zodiacal sign which governs the date of his birth, whereby to enable him to ascertain what horoscope reading in the said printed horoscopic areas applies to him, in order that he may give it attention when it appears in said horoscopic window.

2. A casing having a face plate overlying an annular area, a master disk supported by said casing to rotate about an axis concentric with said annular area, a composite disk composed of a multiplicity of superimposed sheets each having a horoscopic printed area, means to mount said composite disk on said master disk in a concentric overlying relation to a face thereof, said sheets being individually detachable to successively display new areas of their printing matter, a cover overlying said composite disk, said cover having a horoscope window through which said horoscopic matter is observable, means to rotate said master disk in a timed step by step fashion to bring said horoscopic printed areas into view through said horoscope window, a series of zodiacal signs mounted upon the outer peripheral portion of said face plate, said signs each portraying, astrologically, a sign of the zodiac and having juxtaposed thereto designations of the calendar days allotted to such sign, thereby acquainting an observer with the zodiacal sign which governs the date of his birth, whereby to enable him to ascertain what horoscope reading in the said printed horoscopic areas applies to him, in order that he may give it attention when it appears in said horoscopic window, an indicating element mounted adjacent to each of said zodiacal signs, and means to illuminate said indicating element when the horoscopic reading to which it appertains appears in said horoscopic window.

3. In a horoscopic indication means, cover means furnished with a window, mechanism to successively move a series of horoscopic readings at timed intervals into view through said window, said cover means having inscribed upon it designations of the twelve signs of the zodiac, each of said designations being accompanied by a statement in days as to the calendar period included within the sign designated, each of said horoscopic readings being accompanied by a designation displayed therewith of the sign of the zodiac to which it pertains, and indicating means adjacent said designations operatively connected with the aforesaid mechanism to indicate which of said zodiacal signs on the cover is governing the particular horoscopic reading appearing in said window at any given time.

4. The subject matter of claim 3, said indicating means comprising a plurality of electric lamps.

HORACE G. BROWN, Jr.